United States Patent [19]

Fisher et al.

[11] 4,300,866
[45] Nov. 17, 1981

[54] SELF-RETAINING SPRING WASHER

[75] Inventors: Charles K. Fisher, Belford, N.J.; Pierre E. Arias, Margency, France

[73] Assignee: TRW Inc., Cleveland, Ohio

[21] Appl. No.: 107,127

[22] Filed: Dec. 26, 1979

[51] Int. Cl.³ ............... F16B 37/02; F16B 43/00
[52] U.S. Cl. ............................ 411/155; 411/163; 411/437; 411/533
[58] Field of Search ............... 151/38, 37, 35, 15, 151/30, 16; 85/32 V, 36; 411/155, 156, 163, 160, 533, 544, 372, 371, 437

[56] References Cited

U.S. PATENT DOCUMENTS

| | | | |
|---|---|---|---|
| 1,017,471 | 2/1912 | Ryden et al. | 151/30 X |
| 2,382,936 | 8/1945 | Bedford, Jr. | 85/36 |
| 3,164,055 | 1/1965 | Duffy | 151/38 X |
| 3,212,391 | 10/1965 | Duffy | 85/36 |
| 3,422,722 | 1/1969 | Ptak | 85/32 V |
| 3,570,361 | 3/1971 | Tinnerman | 85/32 V |
| 4,228,837 | 10/1980 | Lyons | 151/30 X |

Primary Examiner—Ramon S. Britts
Attorney, Agent, or Firm—James R. O'Connor; Martin J. O'Donnell; Thomas C. O'Konski

[57] ABSTRACT

A one-piece spring washer for use with threaded fasteners such as screws has a self-retention feature whereby, once positioned on the screw, it remains firmly in place. The washer comprises an annular body defining a central aperture for receiving the screw shank and a plurality of thread engaging teeth bent up from the body about the aperture for holding the washer in place. Each tooth has a helical thread confronting edge having a pitch that is steeper than, and in the opposite sense of, the pitch of the screw thread so that the teeth extend crosswise of and grip the crest of the thread. A plurality of spring elements are bent up from the washer body outboard of, but in the same direction as, the teeth. The spring elements, which flex downwardly when the screw is tightened against a workpiece, load the screw axially to resist loosening of the screw.

16 Claims, 9 Drawing Figures

SELF-RETAINING SPRING WASHER

BACKGROUND OF THE INVENTION

The invention relates generally to the field of threaded fasteners, and more specifically, to a spring washer that is adapted to be non-removably retained on such a fastener.

Threaded fasteners, such as screws, bolts and the like, are commonly used in industry, particularly where it is desired to provide a strong, sturdy connection between two workpieces that is not intended to be permanent. Such fasteners may be used with threaded nuts, or may simply thread through holes provided in one or both of the workpieces to be joined. The fasteners are available in various standard sizes and designs which include differently sized and oriented threads, differently shaped heads, and different shank lengths. The variety of sizes and designs permit the selection of the optimum fastener for each particular application.

It is common practice when using threaded fasteners to provide a spring washer between the head of the fastener and the workpiece. Many spring washers serve a dual purpose. Firstly, as in the case of conventional flat washers, the spring washers typically provide an enlarged surface against which the head of the fastener can turn to help prevent scratching or other damage to the workpiece during tightening of the fastener, and after tightening, to help prevent the head of the fastener from being pulled through the workpiece under excessive load. Secondly, the spring washers resiliently bias the head of the fastener away from the workpiece, causing the threads of the fastener to grip the workpiece more tightly thereby to prevent loosening of the fastener due to workpiece vibration and the like.

Ordinarily, the washers and fasteners are provided separately to a worker who uses them, and the worker must place the washer on the fastener in advance of their use. The operation of placing a washer on the threaded end of the fastener, while a simple one, can become a considerable time limiting factor in an assembly-line manufacturing operation, such as that employed in the manufacture of automobiles and other vehicles, where many such fasteners are typically installed and where the time the product spends at each assembly line station is necessarily limited. Also, if there are no means for retaining the washer on the fastener after it is inserted, the washer can, and often does, fall off as the worker manipulates the fastener into position for engaging the workpiece. This leads to further delays, as it requires repositioning of the washer. Thus, it is desirable to provide a spring washer that, once positioned on a threaded fastener, remains securely in place thereon during manipulation of the fastener.

Attempts have been made heretofore to provide threaded fasteners having washers already fitted thereon. These attempts, however, have required that the fastener itself be specially designed to retain the washer, or alternatively, have required that fastener manufacturing process be modified so that the threads of the fastener are rolled after the washer is placed on the blank fastener shank. Both of these alternatives undesirably add to the expense of the fastener.

SUMMARY OF THE INVENTION

Accordingly, the present invention aims to provide a new and improved spring washer for use with threaded fasteners.

Another object of the invention to provide a new and improved spring washer that, once positioned on a threaded fastener, remains securely in place.

Another object of the invention is to provide a self-retaining spring washer of the above described type that can be used with standard, unmodified threaded fasteners.

Another object of the invention is to provide a self-retaining spring washer of the above described type that can be easily and quickly positioned on a threaded fastener without the need for any special tools.

Still another object of the invention is to provide a self-retaining spring washer of the above described type that is simple in design and inexpensive to manufacture in quantity.

Other objects will, in part, be obvious and will, in part, appear hereinafter.

In brief, the invention provides a spring washer comprising a generally flat, annular body defining a central aperture for receiving a threaded fastener, such as a screw or bolt, and a plurality of upwardly and inwardly extending thread engaging teeth disposed about the central aperture. Each tooth defines a helical thread confronting edge having a pitch that is steeper than, and in the opposite sense of, the pitch of the threads on the fastener. When the washer is pushed onto the shank of the fastener, the teeth are flexed upwardly and outwardly by their engagement with the threads of the fastener. When the washer pushed fully against the head of the fastener, the teeth extend diagonally across the thread of the fastener and resiliently press against the crest of the thread to securely hold the washer in place.

The body of the washer includes a plurality of integral spring elements that extend upwardly therefrom in the same direction as the upwardly extending thread engaging teeth. The spring elements are adapted to flex downwardly toward the body of the washer and against the head of the fastener as the fastener is tightened down against a workpiece. The spring elements therefore load the fastener axially away from the workpiece causing the threads of the fastener to grip the workpiece tightly and resist loosening due to workpiece vibration or other movement. The thread engaging teeth of the washer also flex downwardly toward the body of the washer as the fastener is tightened against the workpiece, causing the thread confronting edges of the teeth to settle in the groove of the fastener thread. This provides even greater resistance to loosening of the fastener.

Preferably, the spring washers are inexpensively fabricated as one-piece units by conventional blanking techniques from a spring metal material.

BRIEF DESCRIPTION OF THE DRAWING

For a fuller understanding of the nature and objects of the invention, reference should be had to the following detailed description, taken in conjunction with the accompanying drawing, in which.

DETAILED DESCRIPTION OF THE ILLUSTRATIVE EMBODIMENTS

Figure 1:
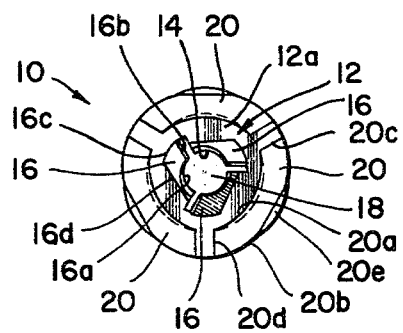
FIG. 1 is a top plan view of a self-retaining spring washer embodying the invention.

Referring now specifically to the drawing, and initially to FIGS. 1 through 5 thereof, a self-retaining spring washer 10 is shown embodying the principles of the invention. The washer 10, which is illustratively integrally fabricated from a piece of resilient sheet material, such as spring steel, includes a generally flat annular body 12 defining an upper surface 12a, a bottom surface 12b and a central aperture 14. A plurality of thread engaging teeth 16 project upwardly from the inner periphery of the body 12 about the central aperture 14. The washer 10 illustratively includes three such teeth 16 which are identical to each other and which are equiangularly spaced about a central axis 18 of the washer 10. The teeth 16 are formed as bent up portions of the radially inner edge of the washer body 12.

Figure 2:
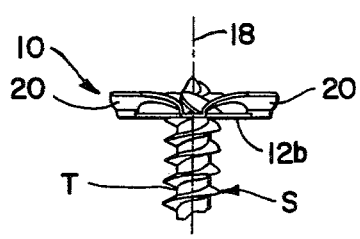
FIG. 2 is a side elevational view of the spring washer shown in FIG. 1 in the process of being positioned on a screw fastener.
Figure 4:
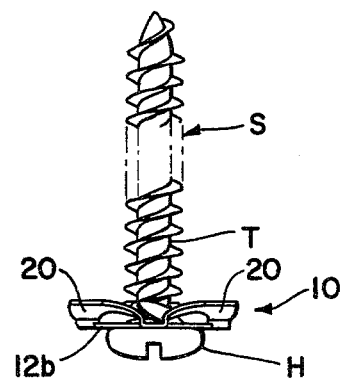
FIG. 4 is a side elevational view similar to the view of FIG. 2 showing the washer fully seated on the screw fastener.
Figure 5:
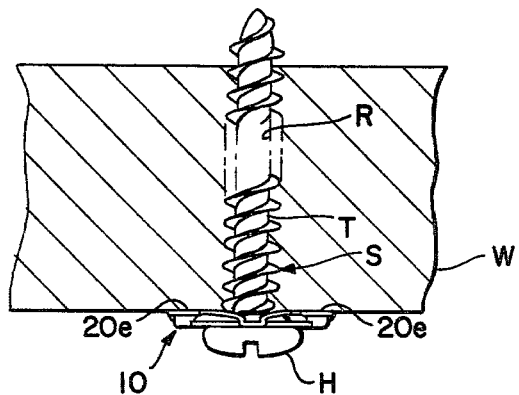
FIG. 5 is a side view similar to the views of FIGS. 2 and 4 showing the screw fastener with the washer thereon being tightened into a workpiece.

As best seen in FIGS. 2 and 4, the washer 10 is adapted to be telescoped over a threaded fastener, such as screw S having a conventional right hand threaded shank T and a head H. The shank T of the screw S passes through the central aperture 14 with the longitudinal axis of the screw shank T aligned with the axis 18 of the washer 10 and with the washer 10 oriented so that the thread engaging teeth 16 project away from the head H of the screw S. The central aperture 14 of the washer 10 preferably has a diameter that is somewhat smaller than the outside diameter of the threads on the shank T, i.e., somewhat smaller than the diametrical distance from the crest of the thread on one side of the shank T to the crest of the thread on the other side of the shank T. As a result, when the washer 10 is pushed downwardly on the shank T, the teeth 16 flex outwardly and upwardly and slide over the crest of the shank thread. The washer 10 is pushed fully home when its bottom surface 12b bears against the head H of the screw S, as shown in FIG. 4. The teeth 16 resiliently press inwardly against the crest of the shank thread to hold the washer 10 firmly in position on the screw S.

The thread engaging teeth 16 on the spring washer 10 of the present invention function very much like the thread engaging teeth on the bolt retainers disclosed in U.S. Pat. No. 3,394,747 to W. B. Duffy, which is assigned to the assignee hereof. As indicated in FIG. 1, each tooth 16 on the washer 10 includes an inner edge 16a, a radial edge 16b, an outer edge 16c and a generally straight bend line 16d at which the tooth 16 joins the washer body 12. The inner edge 16a of each tooth 16 has the shape of a steeply pitched left hand helix which would mate with a left hand screw thread if the screw thread were steep enough. However, the pitch of the helical thread confronting edges 16a of the teeth 16 is substantially steeper than that of a conventional screw thread, i.e., includes a smaller number of thread convolutions per axial length than that of the conventional screw thread. Also, all of the teeth 16 are at the same level, so that each of the thread confronting edges 16a defines its own individual helix. As a result, each thread confronting edge 16a extends diagonally across the crest of the thread of the screw S, as opposed to riding in the groove of the thread as would be the case if the edges 16a were pitched in the same direction as the screw thread. Pulling the washer 10 axially away from the screw head H causes the teeth 16 to toggle inwardly and to bite firmly into the crest of the screw thread, thereby enhancing its retention on the screw S. The washer 10 will thus not fall off of the screw S even during the roughest of handling.

Standard screw threads are typically right handed and typically include approximately ten or more thread convolutions per inch of axial length of the screw shank T. The helical thread confronting edges 16a of the teeth 16 on the washer 10 should be pitched in a sense opposite to that of the screw thread (i.e., left handed) and to a significantly smaller number of thread convolutions per inch of axial length, e.g., three or less convolutions per inch of axial length. Preferably, the pitch and helical length of each thread engaging edge 16a is such that each edge 16a engages and spans more than one convolution of the steepest (i.e., coarsest) thread of the screw on which the washer 10 is to be used.

Figure 3:
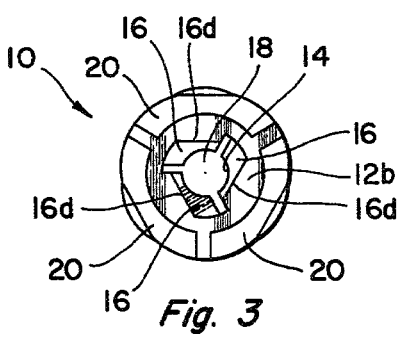
FIG. 3 is a bottom view of the washer of FIG. 1.

As can be appreciated from FIG. 3, the upward bending of the teeth 16 about the bend lines 16d causes the bottom surface 12b of the washer 10 to assume a tapered, funnel-like shape leading into the central aperture 14 which facilitates the insertion of the threaded end of the screw S into the washer 10. It will also be noted from FIG. 1 that the lower end of each tooth 16 is closer to the bend line 16d than the higher end of each tooth 16. The higher end of each tooth 16 is thus relatively more flexible in the outward direction than the lower end of each tooth 16. To insure a smooth sliding of the teeth 16 from one thread convolution to the next as the washer 10 is pushed onto the screw S, the lower end of each tooth 16 may be radially spaced slightly farther from the axis 18 of washer 10 than the higher end of each tooth 16 so as to compensate for the different flexibilities.

In addition to the thread engaging teeth 16, the washer 10 includes a plurality of spring elements 20 that project above the upper surface 12a of the body 12 in the same general direction as the teeth 16. The washer 10 illustratively includes three such spring elements 20 which are formed as bent up portions of the radially outer edge of the washer body 12. As indicated in FIG. 1, each spring element 20 includes an inner edge 20a, an outer edge 20b, and a pair of radial bend lines 20c and 20d at which they join the body 12. As with the teeth 16, the spring elements 20 are preferably identical to each other and equiangularly spaced about the axis 18 of the washer 10.

An intermediate portion of the outer edge 20b of each spring element 20 is downwardly bent to define a lip 20e that is more or less parallel to the plane of the washer body 12. As can be appreciated from FIG. 5, the lips 20e bear against the surface of a workpiece W as the screw S with the washer 10 mounted thereon is tightening into a hole R provided therein to receive the screw S. As the screw head H approaches the workpiece W, the lips 20e, because of their orientation, engage against the workpiece surface and generate a reaction force tending to flex the spring elements 20 downwardly toward the plane of the washer body 12. The lips 20e also present a dull, flat edge to the workpiece surface and thus help prevent scratching of the workpiece surface by the washer 10 as the screw S is tightened. After the screw head H is fully tightened down against the workpiece W, the spring elements 20 resiliently bias the screw head H axially away from the workpiece W, causing the threads of the screw S to grip the workpiece W more tightly. This axial biasing action helps prevent loosening of the screw S due to workpiece vibration and the like.

It should be noted that the thread engaging teeth 16 on the washer 10 also flatten downwardly toward the plane of the washer body 12 as screw head H approaches the workpiece W. Because of the opposite-handedness of the pitch of the teeth 16 compared to that of the screw thread, the teeth 16 themselves have an anti-loosening effect in permitting turning of the screw S in a tightening direction but resisting turning in an opposite, or loosening, direction. The radial edges 16b of the teeth 16, which are biased upwardly into engagement with the workpiece surface, tend to grip the workpiece W to prevent turning of the washer 10 in a loosening direction. Also, when the teeth 16 are forced downwardly sufficiently, the thread confronting edges 16a thereof flex inwardly and settle in the groove of the screw thread to provide even greater resistence to loosening of the screw S.

The washer 10 may be fabricated by blanking the desired generally annular shape from a flat sheet of spring metal, cutting slits through the blanked out shape to define the edges of the teeth 16 and spring elements 20, and bending the teeth 16 and spring elements 20 upwardly about the bend lines 16d, 20c and 20d, respectively. A specially designed tool can be used to perform the blanking, slit cutting and bending operations in a single stroke, thereby permitting the washers 10 to be produced economically in large quantities.

Figure 6:
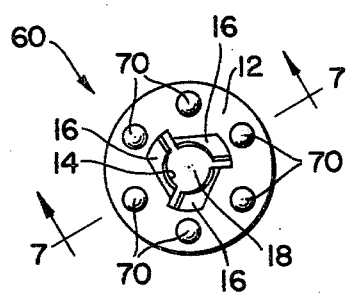
FIG. 6 is a top plan view of a second modified embodiment of the self-retaining spring washer of the invention.
Figure 7:
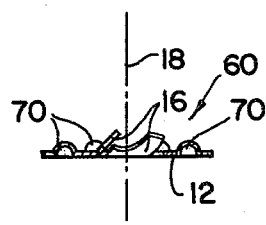
FIG. 7 is a sectional view taken along line 7—7 in FIG. 6.

FIGS. 6 and 7 of the drawing show a modified self-retaining spring washer 60 embodying the principles of the invention. The washer 60 is substantially identical to the washer 10 previously described with the identical components being labeled by identical reference numerals. The washer 60, however, includes a plurality of spring elements 70 which are in the form of dimples bent upwardly from the washer body 12 outboard of but in the same direction as the thread engaging teeth 16. The spring elements 70 are preferably equiangularly spaced about the central axis 18 of the washer 60. Like the spring elements 20 in the washer 10, the spring elements 70 in the washer 60 are adapted to flatten downwardly against a workpiece as a screw bearing the washer 60 is tightened down against the workpiece. The flattened dimple spring elements 70 bias the screw axially away from the workpiece to prevent loosening of the screw.

Figure 8:
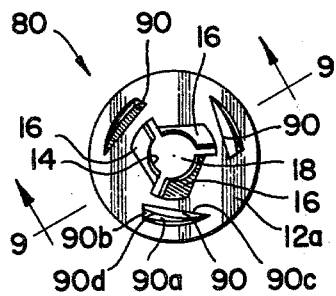
FIG. 8 is a top plan view of a third embodiment of the self-retaining spring washer of the invention.
Figure 9:
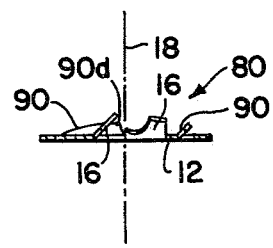
FIG. 9 is a sectional view taken along line 9—9 in FIG. 7.

FIGS. 8 and 9 illustrate another modified self-retaining spring washer 80 embodying the invention. Again, the washer 80 is substantially identical to the washer 10 previously described, with the identical components being labeled by identical reference numerals. The washer 80, however, illustratively includes a plurality of identical, equiangularly spaced spring elements 90 which are in the form of wings bent upwardly from the washer body 12 outboard of the teeth 16. As indicated in FIG. 8, each wing-like spring element 90 includes an outer edge 90a which gradually tapers upwardly from the upper surface 12a of the washer body 12 to a radial edge 90b, and an inner bend line 90c at which it joins to the washer body 12. The tip of each element 90 between its inner edge 90a and its radial edge 90b is bent downwardly to define a lip 90d more or less parallel to the plane of the washer body 12. Like the spring elements 20 in the washer 10 and the spring elements 70 in the washer 60, the wing-like spring elements 90 flex downwardly as a screw bearing the washer 80 is tightened against a workpiece surface and axially bias the screw so as to prevent loosening thereof. The elements 90 are also sloped or tapered in the same direction as the thread engaging teeth 16 of the washer 80 so as to permit turning of the screw in a tightening direction, but to resist turning of the screw in a loosening direction.

The spring washers 10, 60 and 80 are preferably fabricated in various different sizes (e.g., with different diameter central apertures 14) to accommodate the various standard threaded fastener shank sizes. The washers 10, 60 and 80 are easy to slide onto the fastener, and once positioned thereon, remain firmly in place. No special tools are required to position the washers on the fasteners. Also, no modifications need be made to the fasteners themselves in order to retain the washers. Thus, the washers can be used with standard, commercially available fasteners. It will thus be seen that the objects set forth above, among those made apparent from the preceding description, are efficiently attained.

It should be understood that the preceding description is intended to illustrate rather than limit the invention, and that numerous modifications to the above-described illustrative embodiments can be made by those skilled in the art without departing from the scope of the invention as defined by the appended claims. For example, although each of the washers 10, 60 and 80 has been shown with three thread engaging teeth 16, any desired number of such teeth 16 may be used. At least two such teeth 16 equiangularly spaced about the central axis 18 of the washers are desirable to provide a uniform gripping of the fastener threads. Also, the washers may be fabricated by any suitable process from any suitable resilient material which, in addition to spring metal, may include a plastic material of the desired resiliency. If a plastic material is used for the washers, then conventional molding techniques may be used for their fabrication. Furthermore, spring element designs other than those specifically shown and described above may be incorporated into the washers to provide the washers with the desired axial biasing effect.

While the washer 10 has been shown in use on a screw S, it should be understood that the washers of the invention can also be used on bolts and on other threaded fasteners of various designs.

It is thus the object of the appended claims to cover these and other modifications as come within the true scope of the invention.

What I claim as new and desire to secure by Letters Patent of the United States is:

1. In combination, spring washer a and a threaded fastener of the type including a threaded shank and a head, the thread of the fastener having a crest, a groove and a predetermined sense and pitch, said washer comprising:

A. a generally flat, annular body defining a top surface, a bottom surface and a central aperture for receiving the shank of the fastener, the bottom surface of said body being adapted to bear against the head of the fastener;

B. a plurality of thread engaging teeth projecting above the top surface of said body about the central aperture for resiliently engaging the thread of the fastener and for retaining the washer on the fastener, each of said teeth including
  i. a helical thread confronting edge that is oriented in a sense opposite to the sense of the fastener thread and having a pitch that is substantially steeper than the pitch of the fastener thread so as to engage and extend diagonally crosswise of the crest of the fastener thread; and C. a plurality of spring elements also projecting above the top surface of said body in the same general direction as said teeth, said spring elements being adapted to flex downwardly toward said body when the head of the fastener is tightened against a workpiece and to resiliently bias the fastener axially away from the workpiece thereby to prevent loosening of the fastener relative to the workpiece.

2. The combination of claim 1 in which said washer is integrally fabricated from a resilient material.

3. The combination of claim 2 in which said resilient material is a spring metal.

4. The combination of claim 2 in which said resilient material is a plastic material.

5. The combination of claim 1 in which the sense of the fastener thread is right handed and in which the sense of each of said helical thread confronting edges on said teeth is left handed.

6. The combination of claim 1 in which the relationship between the pitch of said helical thread confronting edges on said teeth and the pitch of the fastener thread is such that each of said helical thread confronting edges engages and spans more than one convolution of the fastener thread.

7. The combination of claim 1 in which said teeth are equiangularly disposed about the central aperture defined by said body.

8. The combination of claim 1 including three or more of said teeth.

9. The combination of claim 1 in which said teeth are adapted to flex downwardly when the head of the fastener is tightened against the workpiece, so that said thread confronting edges on said teeth settle into the groove of the fastener thread.

10. The combination of claim 1 in which said spring elements are equiangularly disposed about the central aperture defined by said body.

11. The combination of claim 2 in which said spring elements are formed as upwardly bent portions of the outer edge of said washer body.

12. The combination of claim 11 in which the uppermost portion of each of said bent up spring elements defines a lip more or less parallel to the plane of said washer body for bearing against the workpiece when the fastener is tightened therein.

13. A spring washer for use in combination with a threaded fastener of the type including a threaded shank and a head, said washer comprising
  (A) a generally flat annular body defining a top surface, a bottom surface and a central shank-receiving aperture;
  (B) a plurality of threaded-engaging teeth projecting above the top surface of said body about the central aperture, said teeth having thread-confronting edges which are inclined relative to the fastener body, and
  (C) a plurality of upwardly biasing spring elements projecting above the top surface of said body radially outboard of said teeth, each said spring element having at least one flexible, resilient segment extending obliquely up from the top surface of said body so that the spring element as a whole is flexible toward the general plane of said body and when so flexed tends to resume its natural unstressed position wherein it projects above said body.

14. The spring washer defined in claim 13 wherein each spring element comprises a flexible resilient inclined tab struck from said body.

15. The spring washer defined in claim 13 wherein each spring element comprises a dimple formed in said body, the side wall of which constitutes said oblique segment.

16. The spring washer defined in claim 13 wherein each spring element comprises an upwardly bent portion of the outer edge margin of said body, at least one segment of which constitutes a said oblique segment.

* * * * *